United States Patent [19]

Van der Grijn et al.

[11] Patent Number: 5,170,563
[45] Date of Patent: Dec. 15, 1992

[54] SHAVING UNIT FOR A SHAVER AND SHAVER COMPRISING SUCH A SHAVING UNIT

[75] Inventors: Adriaan Van der Grijn; Hendrik W. Strijker, both of Drachten; Heinz Dimigen; Hubertus Hübsch, both of Hamburg, all of Fed. Rep. of Germany

[73] Assignee: U.S. Philips Corp., New York, N.Y.

[21] Appl. No.: 301,003

[22] Filed: Jan. 23, 1989

[30] Foreign Application Priority Data

Feb. 12, 1988 [NL] Netherlands .......................... 8800345

[51] Int. Cl.$^5$ .............................................. B26B 9/00
[52] U.S. Cl. ................................... 30/350; 428/244; 30/43; 30/316.53; 30/346.51; 30/316.54; 204/192.16
[58] Field of Search ................ 30/43.5, 350, 346.54, 30/43, 346.53, 346.51; 428/469, 698; 204/192.16

[56] References Cited

U.S. PATENT DOCUMENTS 3,064,349 11/1962 Fulterer et al. .................... 30/350
3,844,033 10/1974 Yonkers ........................... 30/43.5

Primary Examiner—Timothy V. Eley
Assistant Examiner—Willmon Fridie, Jr.
Attorney, Agent, or Firm—Ernestine C. Bartlett

[57] ABSTRACT

A shaving unit for a shaver is provided comprising a shear plate and a cutting member, one of the cooperating surfaces being covered with a friction-reducing layer comprising carbon and metal in an atomic ratio between 50.1/49.9 and 99.9/0.1.

18 Claims, 1 Drawing Sheet ium or nickel.

SHAVING UNIT FOR A SHAVER AND SHAVER COMPRISING SUCH A SHAVING UNIT

FIELD OF THE INVENTION

The invention relates to a shaving unit for a shaver, which comprises a shear plate having hair-entry apertures and a drivable cutting member which is constructed to cooperate with said shear plate.

The invention also relates to a shaver comprising such a shaving unit, in particular a shaver comprising an electric motor for driving the cutting member.

BACKGROUND OF THE INVENTION

Particularly in the case of shavers having one or more (rechargeable) batteries as the power source, it is important to minimize the friction between cooperating parts and hence the mechanical losses.

An important source of mechanical losses is the friction between the cooperating parts of the shaving unit.

The shaving units of shavers become soiled relatively rapidly during operation. The parts of the shaving unit contact facial hairs, scales, perspiration and sebaceous matter. Substances present on the skin such as water, residues of soap or cosmetic products, dust and the like also contribute to the soiling of the shaving units.

As a consequence, the number of shaves which can be performed, for example, with one charge in the case of battery-powered shavers decreases in time, and in all types of shavers the efficiency of the shaving unit may also descrease.

In European Patent Specification 0 087 836, which corresponds substantially to U.S. Pat. No. 4,525,417, issued Jun. 25, 1985, a description is given of a friction-reducing layer which comprises carbon and a metal, the atomic ratio between carbon and metal ranging between 50.1/49.9 and 99.9/0.1 and the ratio of metal to carbon differing from the stoichiometric ratio of a carbide. Preferably, this ratio ranges between 60/40 and 97/3, the best results being obtained at ratios between 80/20 and 95/5. Besides carbon and metal the layer may comprise impurities that results from the atmosphere from which the layers are deposited. In practice it has been found that such an impurity consists of, for example, hydrogen, if a hydrocarbon atmosphere has been used to deposit the carbon. The layers are generally X-ray amorphous and do not have the stoichiometric composition of a carbide.

In the said European Patent Specification 00 87 836 it is stated that the friction-reducing layers can be applied to, amongst others, shaving heads of electric shavers. It is stated that the lowest coefficient of friction is obtained if both cooperating faces are covered with the friction-reducing layer.

We have found that the operating conditions of shavers having a rotating cutting member are such that if both parts are covered with a friction-reducing metal-carbon layer the coefficient of friction between the cooperating parts of the shaving unit is higher when in the case that only one of the parts is covered with such a friction-reducing layer. Moreover, it has been found that preferably only the shear plate should be covered with such a layer.

SUMMARY OF THE INVENTION

An object of the invention is to provide a shaving unit and a shaver comprising such a unit, in which the friction between the surfaces of cooperating parts remains as low as possible even under the most unfavorable conditions.

Consequently, the invention is characterized in that one of the two cooperating surfaces of the shear plate and the cutting member is provided with a friction-reducing layer which comprises carbon and metal in an atomic ratio of 50.1/49.9 to 99.9/0.1 and the ratio of metal to carbon differs from the stoichiometric ratio of a carbide. Preferably, the shear plate is provided with a friction-reducing layer which comprises carbon and metal in an atomic ratio of from 50.1/49.9 to 99.1/0.1 on the side facing the cutting member. In the case of shavers having a vibrating cutting member, however, the layer is preferably provided on the cutting member. Preferably, the atomic ratio between carbon and metal ranges between 60/40 and 97/3, the lowest coefficient of friction being obtained at an atomic ratio between 80/20 and 95/5.

The friction-reducing layer can be applied in the manner described in European Patent Specification 00 87 836, and its substantial equivalent U.S. Pat. No. 4,525,417, the disclosures of which are incorporated herein by reference. For example, the friction-reducing layer can be applied by cathode sputtering of carbon and metal targets or a metal target in a hydrocarbon-containing atmosphere.

The adhesion of the layer may be improved by first applying a thin layer of the metal in question and subsequently applying the carbon-metal layer.

It was found that the friction-reducing layers in accordance with European Patent Specification 00 87 836 are sometimes nobler, in electrochemical respect, than the underlying metal. In such cases it may be advantageous to first provide the surface to be covered with the friction-reducing layer with a layer of a metal which protects the underlying metal against electrochemical corrosion, thereby additionally improving the adhesion of the metal-carbon layer to the substrate. A suitable metal for this purpose is, for example, chromium or nickel.

BRIEF DESCRIPTION OF THE DRAWINGS

The invention will now be explained in greater detail by means of exemplary embodiments and with reference to a drawing, in which.

DETAILED DESCRIPTION OF PREFERRED EMBODIMENTS

Figure 1:
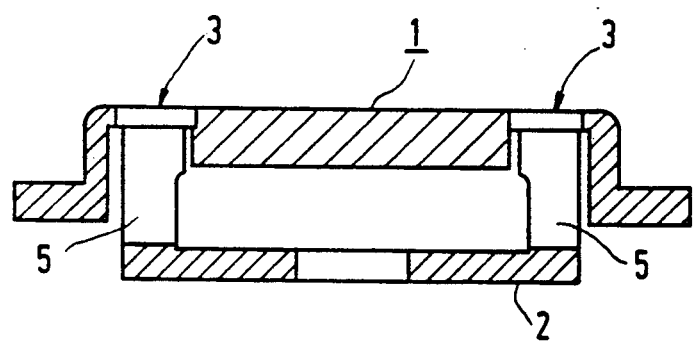
FIG. 1 is a diagrammatic sectional view of a shaving unit.
Figure 2:
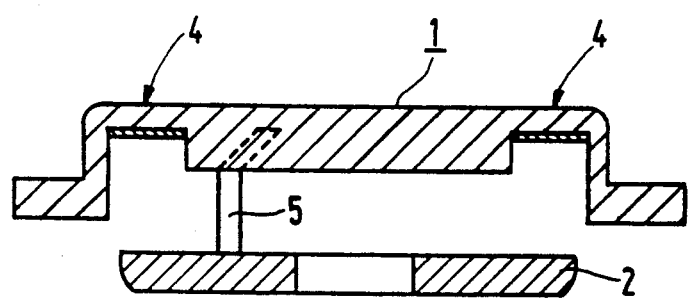
FIG. 2 is a different diagrammatic sectional view of a shaving unit.

FIG. 1 is a sectional view of a shaving unit comprising a shear plate 1 and a cutting member 2. The shear plate 1 comprises a number of circularly arranged, radially directed hair-entry apertures 3 which are separated by portions 4 (FIG. 2). The cutting member 2 supports a number of cutting elements, two of which are shown in FIG. 1. During shaving the side of the shear plate 1 which is remote from the cutting member 2 is pressed against the skin. The hairs to be shaved off project through the hair-entry apertures 3 and are cut away by the cutting elements 5 present on the rotating cutting member.

FIG. 2 is a sectional view of the shaving unit, which is depicted such that a section of the portions 4 between the hair-entry apertures 3 is shown. A friction-reducing metal-carbon layer is present on the portions 4 on the side facing the cutting member 2. Such a layer of, for example, tungsten-carbon can be obtained by sputtering a target of pure tungsten in a cathode sputtering arrangement in an atmosphere composed of argon and a hydrocarbon gas such as acetylene. In this manner, layers having a thickness of approximately 2 μm, can be obtained which are composed of 55 at. % of carbon, 6 at. % of tungsten and the remainder hydrogen. (C/Me ratio 55/6=9.17).

Torque measurements carried out before and after a number of shaves by means of the shaving unit gave the following results.

TABLE

| Portions 4 with/ without coating | Average torque during shaving | |
|---|---|---|
| | first shave | 360th shave |
| Uncoated | 31 g-cm(s* = 6) | 37 g-cm(s = 9) |
| Coated | 21 g-cm(s = 4) | 26 g-cm(s = 5) |

*s = standard deviation

In practice it was found that a further improvement could be obtained if the portions 4 of the shear plate were provided with a thin layer (0.4 μm) of chromium before they were covered with tungsten-carbon. In this manner corrosion was effectively reduced and the adhesion of the tungsten-carbon layer was improved.

We claim:

1. A shaving unit for a shaver, which comprises a shear plate having hair-entry apertures and a drivable cutting member which is constructed to cooperate with said shear plate, wherein one of the two cooperating surfaces of the shear plate and the cutting member is provided with a friction-reducing layer comprising carbon and metal in an atomic ratio ranging between 50.1/49.1 and 99.9/0.1, the ratio of the metal to carbon differing from the stoichiometric ratio of a carbide.

2. A shaving unit as claimed in claim 1, wherein in the case of a shaving unit for a shaver having a rotating cutting member the surface of the shear plate facing the cutting member and cooperating therewith is covered with a friction-reducing layer comprising carbon and metal in an atomic ratio of from 50.1/49.9 to 99.9/0.1.

3. A shaving unit as claimed in claim 1, wherein in the case of a shaving unit for a shaver having a vibrating cutting member the surface of the cutting member facing the shear plate and cooperating therewith is covered with a friction-reducing layer comprising carbon and metal in an atomic ratio of from 50.1/49.9 to 99.9/0.1.

4. A shaving unit as claimed in claim 1, wherein the friction-reducing layer comprises carbon and metal in an atomic ratio of from 60/40 to 97/3.

5. A shaving unit as claimed in claim 1, wherein the friction-reducing layer comprises carbon and metal in an atomic ratio of from 80/20 to 95/5.

6. A shaving unit as claimed in claim 1 wherein a layer of a metal is applied to the one cooperating surface before the carbon and metal-containing layer is applied, which metal layer protects the underlying metal against corrosion and improves the adhesion of the metal-carbon layer.

7. A shaver provided with a shaving unit as claimed in claim 1.

8. A shaving unit as claimed in claim 2 wherein the friction-reducing layer comprises carbon and metal in an atomic ratio of from 60/40 to 97/3.

9. A shaving member as claimed in claim 3, wherein the friction-reducing layer comprises carbon and metal in an atomic ratio of from 60/40 to 97/3.

10. A shaving unit as claimed in claim 2, wherein the friction-reducing layer comprises carbon and metal in an atomic ratio of from 80/20 to 95/5.

11. A shaving unit as claimed in claim 3, wherein the friction-reducing layer comprises carbon and metal in an atomic ratio of from 80/20 to 95/5.

12. A shaving unit as claimed in claim 2, wherein a layer of metal is first applied after which the friction-reducing layer is applied, which metal layer protects the underlying metal against corrosion and improves the adhesion of the friction-reducing layer.

13. A shaving unit as claimed in claim 3, wherein a layer of a metal is first applied after which the friction-reducing layer is applied, which metal layer protects the underlying metal against corrosion and improves the adhesion of the friction-reducing layer.

14. A shaver provided with a shaving unit as claimed in claim 2.

15. A shaver provided with a shaving unit as claimed in claim 3.

16. A shaver provided with a shaving unit as claimed in claim 4.

17. A shaver provided with a shaving unit as claimed in claim 5.

18. A shaver provided with a shaving unit as claimed in claim 6.

* * * * *